United States Patent [19]

Gruenewald

[11] Patent Number: 4,993,599
[45] Date of Patent: Feb. 19, 1991

[54] STATIC PRESSURE WHIPPING DISPENSER OF WHIPPED PRODUCTS AND PROCESS OF OPERATION

[76] Inventor: Frederick P. Gruenewald, 11 Fox Rd., Waltham, Mass. 02154

[21] Appl. No.: 534,378

[22] Filed: Jun. 6, 1990

Related U.S. Application Data

[63] Continuation of Ser. No. 295,810, Jan. 11, 1989, abandoned.

[51] Int. Cl.$^5$ .............................................. B65D 83/14
[52] U.S. Cl. ..................................... 222/190; 222/195; 222/400.7; 222/464; 261/DIG. 16; 366/336
[58] Field of Search ............... 222/190, 635, 195, 394, 222/400.7, 529, 464, 4, 1; 261/DIG. 16, DIG. 26, 78.2; 366/336, 337, 604; 239/343, 311; 169/44, 14, 15, 74, 76, 89; 264/154, 155

[56] References Cited

U.S. PATENT DOCUMENTS

| | | | |
|---|---|---|---|
| 1,806,192 | 5/1931 | Collins | 222/394 X |
| 1,889,236 | 11/1932 | Burmeister | 261/DIG. 16 X |
| 1,982,884 | 12/1934 | Schroder et al. | 261/DIG. 26 X |
| 2,342,972 | 2/1944 | Roy et al. | 261/DIG. 16 X |
| 2,375,833 | 5/1945 | Urquhart | 222/400.8 X |
| 2,908,334 | 10/1959 | Duggan et al. | 169/15 X |
| 3,064,696 | 11/1962 | Gruenewald | 222/402.25 X |
| 3,209,554 | 10/1965 | MacManus | 261/DIG. 16 X |
| 3,471,064 | 10/1969 | Micallef | 222/190 X |
| 3,713,841 | 1/1973 | MacManus | 261/DIG. 16 X |
| 3,891,739 | 6/1975 | Lawson . | |
| 3,937,364 | 2/1976 | Wright | 222/211 X |
| 4,027,789 | 6/1977 | Dickey | 222/211 X |
| 4,201,736 | 5/1980 | Ellis et al. . | |
| 4,220,258 | 9/1980 | Gruenewald | 222/453 X |

FOREIGN PATENT DOCUMENTS

| | | |
|---|---|---|
| 655876 | 1/1938 | Fed. Rep. of Germany . |
| 943582 | 5/1956 | Fed. Rep. of Germany . |
| 1000301 | 1/1957 | Fed. Rep. of Germany . |
| 1207008 | 9/1970 | United Kingdom . |
| 2031724 | 4/1980 | United Kingdom .................. 169/14 |

*Primary Examiner*—David H. Bollinger
*Attorney, Agent, or Firm*—Owen J. Mefgan

[57] ABSTRACT

A static whipping device and process for intermixing of a whippable liquid and a propellant gas under pressure to produce a whipped product. The device includes a pressure chamber with a top and a bottom and a valve for introducing a propellant gas and for dispensing a whipped product. The valve is adjacent the top of the container. A static mixer for intermixing the whippable liquid and the propellant gas is disposed in the chamber. It includes elongated a tubular member, preferably formed of plastic, having one end connected to the valve for dispensing the whipped product and the other end extending to near the bottom of the chamber. It further includes an internal mixer disposed within the tubular member and adjacent the top of the container. An aperture is disposed in the tublar member adjacent the internal mixer for permitting a limited amount of the propellant gas to enter the tubular member. The aperture is disposed in the upper portion of the elongated tubular member and is in communication with the charged propellant, whereby when the dispensing valve is open, the pressurized whippable liquid flows through the tublular member and the internal mixing means and by the aperture where it is intermixed with the propellant gas that bleeds through the aperture to intermix with and agitate the whippable liquid, the agitation and intermixing continuing through the tubular member to produce a whipped porduct.

10 Claims, 3 Drawing Sheets

STATIC PRESSURE WHIPPING DISPENSER OF WHIPPED PRODUCTS AND PROCESS OF OPERATION

This is a continuation of copending application(s) Ser. No. 07/295,810 filed on 1/11/89 now abandoned.

FIELD OF THE INVENTION

The present invention relates to the aeration of whippable fluids and more particularly to a new and improved apparatus and method for pressurized whipping or emulsifying of food products and dispensing the same.

DESCRIPTION OF THE PRIOR ART

Whipped, aerated or emulsified food products have been known and used for some time as well as methods and apparatus for producing the same. Whipped cream, for example for household and commercial use, was heretofore produced by mechanical mixers and beaters that are manually or power driven. Currently, they have largely been replaced by disposable aerosol cans and refillable pressure whippers.

An important use of whipping equipment is to produce whipped food products such as whipped cream, imitation whipped cream and toppings for application to deserts such as ice cream sundaes, cakes, pies and the like at ice cream parlors, restaurants, hotels and commercial bakeries wherein the toppings must remain stiff and stable for relatively long periods of time and under adverse conditions.

Whipping by effervescence, that is whipping by utilizing pressurized equipment, is also well known. In whipping by effervescence, a liquid food product such as cream is introduced to a pressurized container and a gas such as nitrous oxide alone or mixed with carbon dioxide is dissolved or dispersed in the cream under pressure. The solubility of a gas in the cream is generally directly proportional to the pressure encountered. Upon release of the pressurized cream to the atmosphere through a suitable nozzle, the gas passes out of solution but the fat masses tend to remain as foam. Accordingly, whipped cream has been described as a dispersion of air or gas cells and clumped fat masses as contiguous phases in cream serums in the form of a more or less rigid foam.

The process of whipping includes dispensing and incorporating small bubbles of a gas into a whippable material to cause expansion of the material. The expansion is commonly referred to as overrun. Thus, if the whipped product occupies twice the space of the original material, it is said to have one hundred percent overrun. The stability of the whipped product, particularly under high overrun, is in large measure dependent upon the size of the gas bubbles and the uniformity in size and distribution. The characteristics generally considered in evaluating the quality of whipped products dispensed from a pressurized container include its stiffness and stability, over-run, drainage and appearance or shape. Such qualities are in great part dependent upon the efficiency of the pressurized whipping to provide intimate mixing of the whippable liquid and the propellant or propellant gas. Other qualities to be considered are the simplicity of the process and apparatus for pressurized whipping and dispensing of whipped products.

Exemplary of the state of the art of such pressurized whipping apparatus and methods are the following U.S. Pat. Nos.:

| | | |
|---|---|---|
| 1,889,236 | 2,375,833 | 3,713,841 |
| 2,342,972 | 3,209,554 | 4,220,258 |

While such prior devices provide limited improvements in the areas intended, there still exists a great need for a new and improved static whipping method and an apparatus which is simple in construction, efficient in use and economical in manufacture. I have found that the basic aeration theory, the equipment design and the process of operating has some serious flaws. I have particularly found that an improvement ca be made in the introduction of the propellant gas into the whippable liquid. I have found that there exists a need for a whipping apparatus and method which is simple in construction, efficient in use and economical in manufacture. Previously, the gas was introduced into the whippable liquid by manually agitating (shaking) the pressurized container. I have found that when operators agitate the whippable liquid, the quantity of gas introduced into the cream can vary because the duration and degree of agitation can not be controlled and thus the amount of overrun can vary widely. Moreover, if the container is agitated too much, the liquid can turn into a gel-like or buttery consistency within the container and will be expelled, if at all, in that gel-like or buttery consistence which results in large amounts of cream waste in the devices of the prior art. More importantly, the pressure systems of the prior art cannot hold dissolved pressurizing gas in the cream for more than a limited amount of time. When the gas emerges from the solution and returns to the head space, the subsequent servings of cream frequently become soft and semi-liquid and are unacceptable. The operator may attempt to rectify the problem by shaking the container further or recharging the vessel which causes the remaining cream to become buttery and unusable.

Accordingly, a principal object of the present invention is to provide a whipping and dispensing device having no need for agitation of the container that holds the whippable liquid.

A further object of the present invention is to provide a pressurized whipping and dispensing device which provides a new and improved static whipping and dispensing.

A still further object of the present invention is to provide a static pressurized whipping and dispensing device having improved cleaning, sanitation and maintenance characteristics.

Another object of the invention is to provide static whipping for portable dispensers in which the need for shaking is eliminated thus improving safety since operators can avoid the risk of dropping the dispenser and breaking it while it is being shaken.

These and other objects of the invention will in part appear hereinafter and will in part become apparent after consideration of the specification with reference to the accompanying drawings and the claims.

SUMMARY OF THE INVENTION

The present invention provides a method and device for static whipping and dispensing of whippable food products. The device includes a container having an interior chamber adapted to confine propellant gas and a given amount of whippable liquid under a propellant gas pressure by means of a cap element which is secured to the container and which closes the chamber. The cap is provided with a combined charging and dispensing passage therethrough. A combined charging and dispensing nozzle or two-way valve, which controls both the delivery of the propellant gas to the chamber for charging the it, and also the dispensing of the contents is disposed outside of cap and connected to one end of the passage. Exemplary of the nozzle or valve is the device described in U.S. Pat. No. 3,064,696. A static means for intimate mixing of the whippable liquid and the propellant or charging gas is disposed within the chamber and includes an elongated tubular member having one end connected to the other end of the charging and dispensing passage in the cap and the other end extending to a point adjacent the bottom of the chamber whereby when the container is charged with the whipping liquid and propellant gas. The lower portion of the tubular member is positioned in the whippable liquid and the upper portion is positioned in the head space above the liquid. An aperture is disposed in the tubular member at a point in the head space above the level of the given amount of whippable liquid. The size of the aperture is critical and is selected so as to permit a limited amount of propellant gas to enter the tubular member from the head space of the container as discussed hereinafter. The static means further includes an internal mixer means which preferably is an elongated core member having a multiplicity of semi-rigid fiber elements extending generally radially about the core member and disposed within the tubular member. The diameter of the mixer means is preferably slightly larger than the diameter of the tubular member so as to frictionally hold the fiber elements in the tubular member when inserted. The fibers preferably extend from a point below the aperture to a point adjacent the upper end of the tubular member and the passage of the cap element.

The method of producing the whippable food products comprises supplying a given quantity of whippable liquid to a pressure container, introducing a propellant gas to pressurize the whippable liquid, causing a portion of the whippable liquid to flow through an elongated zone of restricted area, engaging the liquid with a multiplicity of static mixing means disposed in the restricted zone while introducing a limited volume of propellant gas to the restricted zone, contacting the propellant gas with the whippable liquid to agitate the liquid and cause an intimate intermixing of the liquid and cause an intimate intermixing of the liquid and gas, continuing the static agitation and intermixing to produce a whipped product as it passes through a dispensing nozzle by expansion of the propellant or propellant gas intermixed with the liquid.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF THE PREFERRED EMBODIMENT

Figure 1:
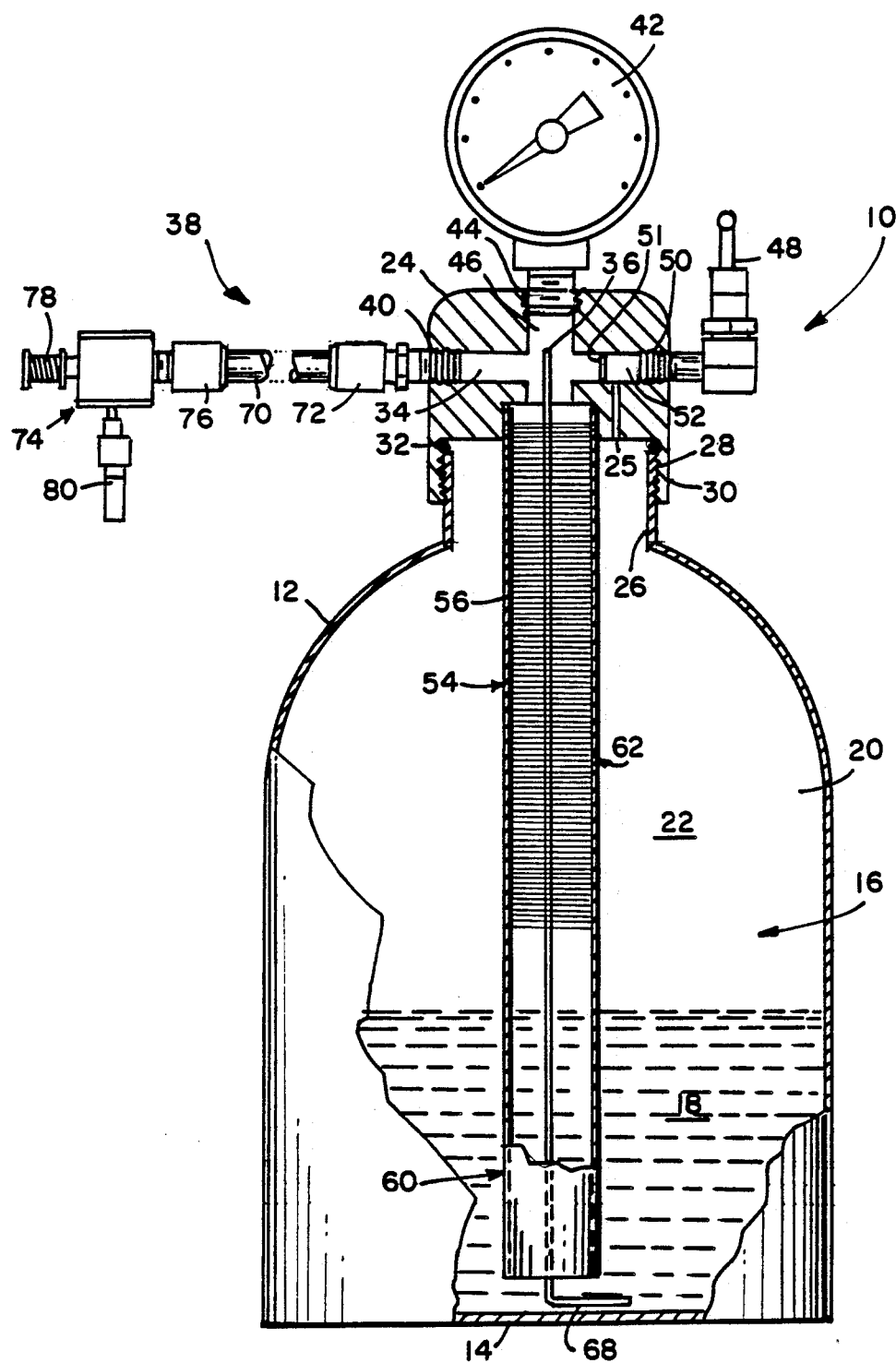
FIG. 1 is a side elevational view partly in section of a pressurized static whipping container employing the principals of the present invention.

Referring now to the drawings, and more particularly to FIG. 1, there is illustrated a pressurized static whipping and dispensing container, indicated generally by the numeral 10, employing the principals of the present invention. The pressurized container 10 includes a side wall 12, a bottom wall 14 and an interior chamber 16 which is adapted to hold a given amount of whippable liquid 18 under pressure of a propellant gas which fills the head space 22 above the liquid 18. A cap 24 is secured to the externally threaded neck of the container 10 by mating screw threads 28 disposed in the male section 30 of cap 24. An O-ring seal 32 is disposed between the mouth of the neck 26 and the interior of the cap 24 to prevent leakage of fluids. The cap 24 is provided with a combined charging and dispensing passageway or conduit 34, one end of which communicates with the chamber 16 and the static means (discussed hereinafter). The other end of the passageway 34 communicates with a two-way valve system, indicated generally by the numeral 38, which is screw threaded into the cap, as shown at 40. The two-way valve system 38 controls both the delivery of the high pressure charging or propellant gas 20 into the chamber 16 of the container for charging the latter and also the dispensing of the pressurized contents of the chamber. The cap is also preferably provided with a conventional pressure gauge 42 which is screw threaded into the top of cap 24, as shown at 44 and communicates with chamber 16 through passageway 46. The cap is further preferably provided with a conventional safety vent valve 48 which is screw threaded into the side of the cap, as shown at 50 and communicates with the chamber 16 through passageway 25. Direct communication with passageway 46 is blocked by a diaphragm 51.

A static means for intimate mixing of the whippable liquid and the propellant or charging gas is disposed within the chamber 16 and includes an elongated tubular member 54 preferably made of a polymeric material such as Nylon or polypropylene, having the upper end 56, which is preferably force fitted into internal bore 57 of the cap, as shown at 58 but may be screw-threaded also. In this manner, the upper end 56 communicates with the charging and dispensing passage 34 in the cap 24. The length of the tubular member 54 is selected with respect to the height of the container so that when attached to the cap, the lower portion 60 extends into the whippable liquid 18 and is adjacent the bottom 14 of the chamber 16 while the upper portion 56 is positioned in the head space 22 above the liquid when the container is charged with the whippable liquid and propellant.

An aperture 62 is disposed in the tubular member 54 so as to be positioned at a point in the head space 22 above the level of the given amount of whippable liquid 18. The size of the aperture is between about 0.016 and 0.020 inches and is critical. It is selected so as to permit a limited amount of propellant gas 20 to enter the tubular member from the head space of the container as discussed hereinafter. The aperture is formed by making a hole in the tubular member 54 and then sealing the perimeter of the hole by heating it to the plastic's softening point whereby the plastic will lose its memory and the hole will remain permanently open. Preferably the sealing is accomplished by putting a wire in the hole and heating the wire at or near the softening point (but below the charring point) of the plastic and then withdrawing the wire after the softened material has cooled.

The static means also includes an elongated core member 64 which has a multiplicity of semi-rigid fiber elements 66 extending generally radially about the core member and which is slidably disposed within the tubular member 54. The diameter of the fibers 66 disposed about the core member 64 is preferably slightly larger than the diameter of the tubular member 54 so as to be frictionally held in the tubular member when inserted. The fibers preferably extend from a point at or below the aperture 62 to a point adjacent or slightly below the upper end of the tubular member 54 and the passage 34 of the cap element. The lower end of the core 64 is provided with a handle portion 68 to facilitate the insertion and removal of the core member. It can be appreciated that the core member is in the form of an elongated brush-like device.

The two-way valve system 38 includes a conventional flexible braided hose 70 attached at one end to the cap 24 by a conventional screw-threaded hose connector 72 and at the end to a conventional two-way valve 74 also by a conventional screw-threaded hose connector 76. The two-way charging and dispensing valve 74 is conventional and includes a push button valve assembly 78 and a charging and dispensing nozzle 80.

In a non-limiting example, the pressure static whipping and dispensing device of the present invention is constructed using a stainless steel pressure container having a volume of whippable liquid of two to five quarts, and a stainless steel cap. The static whipping device is formed of Nylon having a length of about 7.25 inches, an outside diameter (O.D.) of 0.500 inches and an inside diameter (I.D.) of 0.330 inches. The core member is formed of stainless steel wire with spiral-wound Nylon fibers. The aperture diameter is 0.018 inches.

Figures 2, 3:
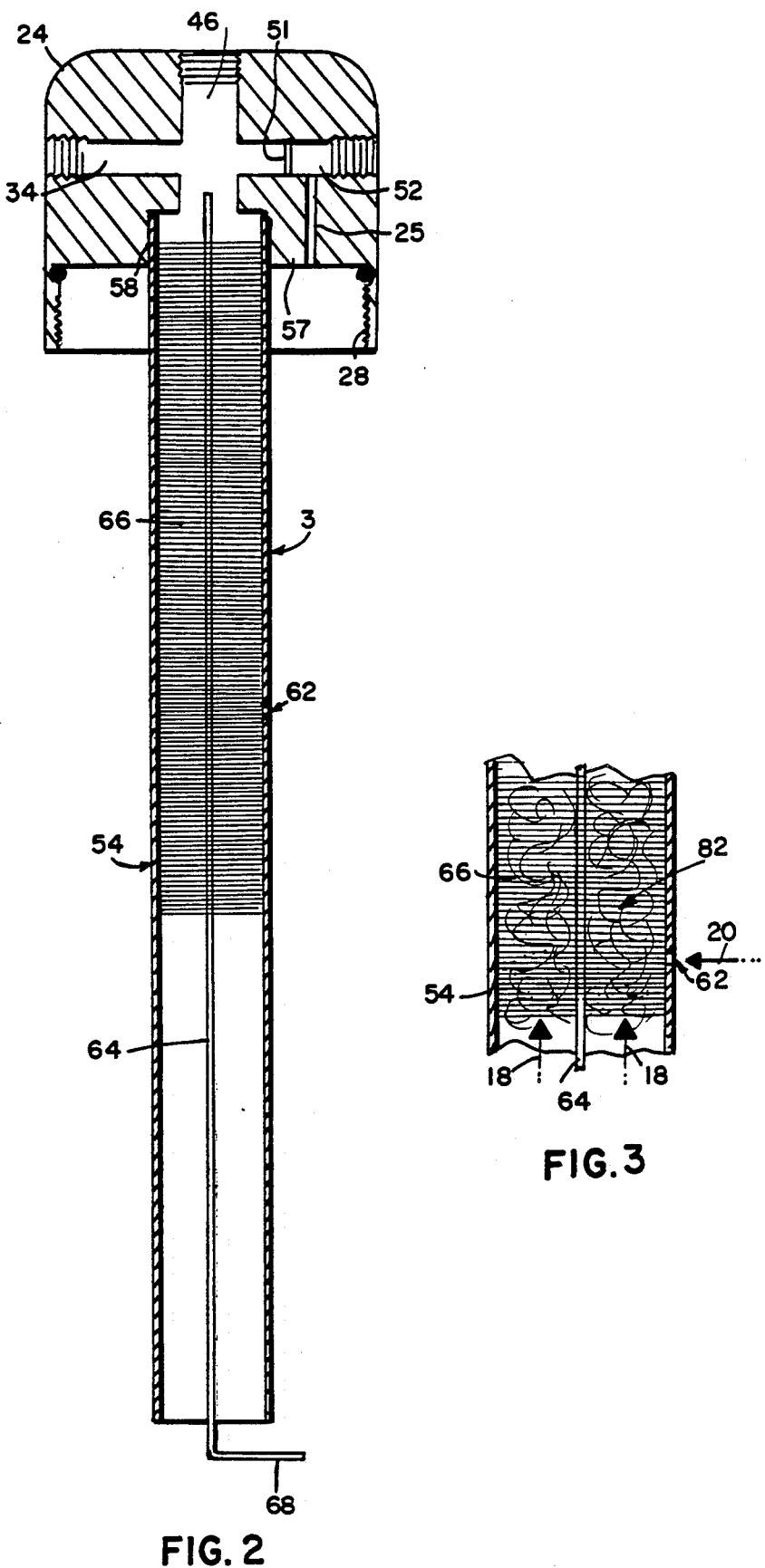
FIG. 2 is an enlarged cross-sectional view of the static whipping device employing the principals of the present invention connected to the pressurized container cap of FIG. 1.
FIG. 3 is an enlarged view of elements of the container shown in FIG. 2.
Figure 4:
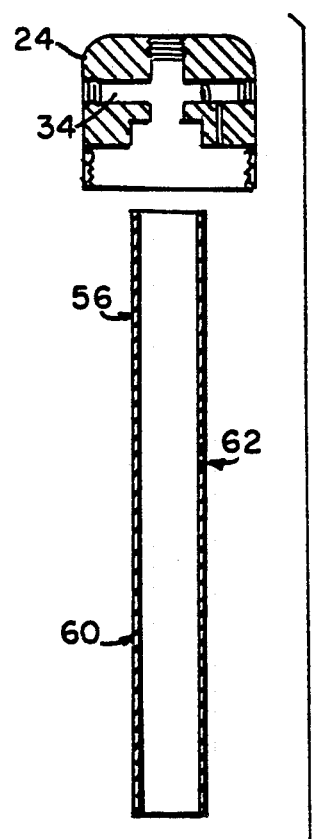
FIG. 4 is an exploded view of the static whipping device of FIG. 2.
Figure 4:
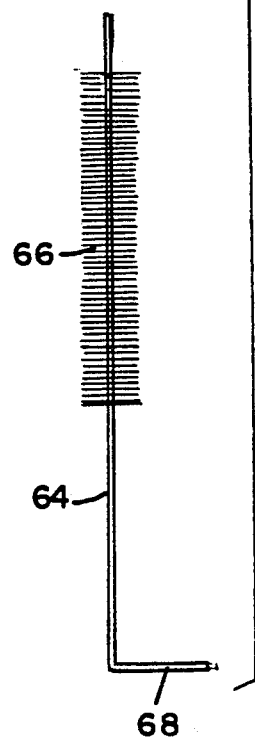

In producing a whippable food product, a given volume of liquid whipping cream is introduced to the chamber of the pressure container and thereafter the container is charged with a propellant gas to a pressure of 200 to 220 psi. No agitation of the container is necessary to dissolve the propellent gas into the cream. When the operator desires to dispense whipped cream, the dispensing push button is pressed. At this point, the propellant gas pressure in the chamber causes the whippable liquid to flow or syphon up the whipping tube and into contact with the fibers of the core member (core brush). At the same time, the propellant gas enters the aperture in the whipping tube and contacts the liquid cream as the cream level passes the aperture as best shown in FIG. 3. The result of the pre-agitation of the liquid cream by the fibers prior to the aperture and the continued agitation as the cream continues to rise together with the increased or violent agitation caused by the introduction of the propellant gas through the aperture causes an intimate intermixing (as represented by the numeral 82 in FIG. 3) of the cream liquid and the gas. The cream and gas continue to intermix as the mixture level rises to the dispensing passage, and produces a whipped product as it passes through the dispensing nozzle by the expansion of the propellant gas that is intermixed with the liquid cream. It can be appreciated that the tubular member provides a venturi effect to the passage of the whippable liquid therethrough due to the restriction within the passageway of the tubular member due to the bristles and the core.

If the operator wishes to refill the pressure container, the remaining head pressure is simply vented off through the safety vent valve. The cap is removed and fresh whippable liquid is added to the capacity of the given amount. The cap is replaced and the container is recharged with the propellant gas.

With respect to sanitation, it is of course necessary upon occasion to dismantle the apparatus and clean all parts. The design of the static means of the present invention is such that the tube and core brush can be easily and readily removed and cleaned or replaced. Furthermore, because of the nature of the core brush, it serves to assist in cleaning the tubular member during the removal process.

With respect to the size of the tubular aperture 62, it can be appreciated that the diameter of the aperture can vary as a function of the maximum propellant gas pressure. However, when it is desirable to admit more propellant gas to the tubular member, several small apertures can be employed rather than a single larger aperture. While the flow of propellant gas through the aperture initially provides some assistance in the form of a suction effect in raising the liquid level in the tubular member, the size of the aperture should not be so large as to unreasonably reduce the propellant gas pressure.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing, shall be interpreted as illustrative and not in a limiting sense.

As my invention, I claim:

1. A static whipping device for intermixing of whippable, edible liquid food product and a propellant gas under pressure comprising:

a pressure container having a top and a bottom;

passageway means for introducing a propellant gas into the pressure container and for passing a mixture of whippable, edible liquid food products and a propellant gas from the container, said passageway means being adjacent the top of said container;

a static means disposed inside said container for intermixing the whippable, edible liquid food products and the propellant gas comprising:

an elongated tubular member having one end connected to said passageway means and the other end being open and extending to a point adjacent the bottom of said container;

an internal mixer means disposed within said tubular member adjacent the top of said container and extending a predetermined length toward the other end of said tube;

an aperture disposed in said tubular member adjacent said internal mixer means for introducing a limited amount of propellant gas into said internal mixer means within said tubular member from said container, said aperture being disposed in the upper portion of the elongated tubular member and in communication with the propellant, whereby when dispensing, the pressurized whippable, edible liquid is caused to flow through the tubular member and the internal mixer means and past the aperture where it is intermixed with a flow of said propellant gas through said aperture to thereby agitate and intermix with said whippable, edible liquid, said agitation and intermixing continuing through said tubular member to produce an intimate mixture of gas and whippable, edible liquid; and means for dispensing whipped, edible food products disposed outside of said container and in fluid flow communication with said passageway means and said static means.

2. The dispenser according to claim 1 wherein the means for dispensing is a single two-way valve.

3. The dispenser according to claim 1 wherein the internal mixer means is an elongated core member having a multiplicity of fiber elements extending generally radially about said core member, said mixer means being disposed within said tubular member.

4. A pressurized device for static whipping and dispensing of whipped food products comprising:
   a container body having an interior chamber adapted to confine propellant gas and a given amount of whippable, edible liquid food products;
   a cap element secured to the container body and closing said chamber;
   said cap element having a combined charging and dispensing passage therethrough;
   a combined charging and dispensing nozzle having a valve means disposed outside of said cap element connected to one end of said passage and normally closing said passage;
   an internal static means for intimate mixing of said whippable liquid and the propellant gas, said internal static means comprising:
      an elongated tubular member having one end connected to the other end of the combined charging and dispensing passage in said cap element and the other end being open and extending to a point adjacent the bottom of said chamber, whereby when said
   chamber contains a given amount of whippable liquid under propellant gas pressure, the open end of said tubular member is positioned in said whippable liquid and the upper portion is positioned in the propellant gas;
   an aperture disposed in the upper portion of the tubular member in communication with said propellant gas, the size of said aperture permitting a limited amount of propellant gas to enter said tubular member;
   an elongated core member having a multiplicity of fiber elements extending generally radially about said core member disposed within said tubular member extending from the end of said tubular member connected to said charging and dispensing passage to a point adjacent said aperture, whereby when the valve means is open, said pressurized liquid is caused to flow into said open end, up said tubular member, through said fiber elements and past said aperture where it is intermixed with a flow of propellant gas through said aperture to thereby agitate and intermix with said whippable liquid, said agitation and intermixing continuing to produce a edible food product for dispensing from said nozzle as a whipped food product.

5. The method of producing whipped food products comprising:
   supplying a given quantity of whippable, edible liquid food product formed of a fat suspended in a liquid to a pressure container;
   introducing a propellant gas into the pressure container to pressurize the whippable, edible liquid food product and form a pressurizing head over said quantity of whippable liquid food product;
   causing a portion of the whippable liquid food product to flow through a tubular member defining an elongated zone of restricted area by the pressure of said propellant gas, said elongated zone of restricted area being disposed within the container;
   engaging said portion of whippable liquid food product with a static agitation means disposed in and extending along the elongated zone while introducing a limited volume of said propellant gas from the pressurizing head into said whippable liquid food product through an aperture in said tubular member adjacent said static agitation means entering into the elongated zone of restricted area;
   contacting the propellant gas that flows through said aperture with the whippable liquid food product to agitate the liquid and cause an intimate intermixing of the liquid and gas as it passes through said static agitation means; and
   expanding the mixture of propellant gas and liquid food product as it is passed through a dispensing nozzle to produce a whipped, edible food product formed of fat.

6. The process according to claim 5 wherein the liquid level is below the aperture.

7. The process according to claim 5 wherein the volume of gas entering the aperture is small relative to the volume of liquid entering into the elongated zone of restricted area.

8. The method according to claim 5 wherein the mixture of liquid food product and propellant gas is statically agitated in said elongated zone by flowing the mixture past said static agitation means which comprises an elongated core member having a multiplicity of fiber elements extending generally radially about said core member.

9. A static whipping device for intermixing of whippable, edible liquid food product and a propellant gas under pressure comprising:
   a pressure container having a top and a bottom;
   passageway means for introducing a propellant gas into the pressure container and for passing a mixture of whippable, edible liquid food product and a propellant gas from the container, said passageway means being adjacent the top of said container;
   a static means disposed inside said container for intermixing the whippable, edible liquid food product and the propellant gas comprising:
      an elongated tubular member formed of plastic having one end connected to said passageway means and the other end being open and extending to a point adjacent the bottom of said container;
      an internal mixer means disposed within said tubular member adjacent the top of said container;
      an aperture disposed in said tubular member adjacent said internal mixer means for permitting a limited amount of propellant gas to enter said tubular member from said container, the perimeter of said aperture being hardened by heating whereby the memory of the plastic is lost around the aperture so that it will not close up, said aperture being disposed in the upper portion of the elongated tubular member and in communication with the propellant, whereby when dispensing, the pressurized whippable, edible liquid is caused to flow through the tubular member and the internal mixer means and past the aperture where it is intermixed with a flow of said propellant gas through said aperture to thereby agitate and intermix with said whippable, edible liquid, said agitation and intermixing continuing through said tubular member to produce an intimate mixture of gas and whippable, edible liquid; and means for dispensing a whipped, edible food product disposed outside of said container and in fluid flow communication with said passageway means and said static means.

10. A pressurized device for static whipping and dispensing of whipped food products comprising:

a container body having an interior chamber adapted to confine propellant gas and a given amount of whippable, edible liquid food product;

a cap element secured to the container body and closing said chamber;

said cap element having a combined charging and dispensing passage therethrough;

a combined charging and dispensing nozzle having a valve means disposed outside of said cap element connected to one end of said passage and normally closing said passage;

an internal static means for intimate mixing of said whippable liquid and the propellant gas, said internal static means comprising:

an elongated tubular member formed of plastic and having one end connected to the other end of the combined charging and dispensing passage in said cap element and the other end being open and extending to a point adjacent the bottom of said chamber, whereby when said chamber contains a given amount of whippable liquid under propellant gas pressure, the open end of said tubular member is positioned in said whipping liquid and the upper portion is positioned in the propellant gas;

an aperture disposed in the upper portion of the tubular member, the perimeter of said aperture being hardened by heating whereby the memory of the plastic is lost around the aperture so that it will not close up, said aperture being in communication with said propellant gas, the size of said aperture permitting a limited amount of propellant gas to enter said tubular member;

an elongated core member having a multiplicity of fiber elements extending generally radially about said core member disposed within said tubular member, whereby when the valve means is open, said pressurized liquid is caused to flow into said open end, up said tubular member, through said fiber elements and past said aperture where it is intermixed with a flow of propellant gas through said aperture to thereby agitate and intermix with said whippable liquid, said agitation and intermixing continuing to produce an edible food product for dispensing from said nozzle as a whipped food product.

* * * * *